US012596775B2

(12) United States Patent
Casas Barrado et al.

(10) Patent No.: US 12,596,775 B2
(45) Date of Patent: Apr. 7, 2026

(54) SYSTEM AND METHODS FOR PAIRING EXTERNAL DEVICES TO VIRTUAL REALITY DEVICES

(71) Applicant: TELEFÓNICA INNOVACIÓN DIGITAL S.L.U., Madrid (ES)

(72) Inventors: Manuel Casas Barrado, Madrid (ES); Berta Sanchez Hueso, Madrid (ES); Guillaume Paris, Madrid (ES); Francisco Jose Rodriguez Perez, Madrid (ES); Pau Masia Martinez, Madrid (ES)

(73) Assignee: TELEFÓNICA INNOVACIÓN DIGITAL S.L.U., Madrid (ES)

( * ) Notice: Subject to any disclaimer, the term of this patent is extended or adjusted under 35 U.S.C. 154(b) by 117 days.

(21) Appl. No.: 18/398,711

(22) Filed: Dec. 28, 2023

(65) Prior Publication Data

US 2024/0220588 A1    Jul. 4, 2024

(30) Foreign Application Priority Data

Dec. 28, 2022    (EP) ..................................... 22383297

(51) Int. Cl.
*G06F 21/00* (2013.01)
*G06F 21/31* (2013.01)

(52) U.S. Cl.
CPC .................................... *G06F 21/31* (2013.01)

(58) Field of Classification Search
CPC ........ G06F 21/31; H04L 63/08; H04W 12/06; H04W 12/50
See application file for complete search history.

(56) References Cited

U.S. PATENT DOCUMENTS

| | | | |
|---|---|---|---|
| 8,866,849 B1 | 10/2014 | Cho et al. | |
| 10,027,926 B1* | 7/2018 | Schirdewahn | .......... H04W 4/02 |
| 2016/0066184 A1* | 3/2016 | Bhargav-Spantzel | ...................... H04L 63/105 726/7 |
| 2018/0287986 A1 | 10/2018 | Yoon et al. | |
| 2019/0020479 A1* | 1/2019 | Antipa | .................. H04W 12/08 |
| 2020/0293166 A1 | 9/2020 | Timonen et al. | |
| 2022/0247869 A1* | 8/2022 | Johnson | ................ H04M 15/60 |

* cited by examiner

*Primary Examiner* — Joseph P Hirl
*Assistant Examiner* — Chi D Nguy
(74) *Attorney, Agent, or Firm* — Hayes Soloway PC

(57) ABSTRACT

A system (100) for pairing a user's mobile device (3) to a user's portable device, the system (100) comprising the user's mobile device (3) using a mobile subscription and comprising a SIM card associated to a Mobile Subscriber Integrated Services Digital Number, MSISDN; and pairing means (4) to perform pairing between the mobile device (3) and the portable device, the VR device (1) comprising computing means (2) to perform pairing between the VR device (1) and the mobile device (3), the VR device (1) being configured to authenticate the user's mobile device (3), wherein authenticate means that the user is in possession of the user's mobile device (3) using the mobile subscription.

11 Claims, 3 Drawing Sheets

<u>100</u>

<u>100</u>

SYSTEM AND METHODS FOR PAIRING EXTERNAL DEVICES TO VIRTUAL REALITY DEVICES

CROSS-REFERENCE TO RELATED APPLICATIONS AND PRIORITY

This patent application claims priority from European Patent Application No. 22383297.3 filed Dec. 28, 2022. This patent application is herein incorporated by reference in its entirety.

DESCRIPTION

Present invention relates to systems and methods for pairing a user's virtual reality, VR, devices.

BACKGROUND OF THE INVENTION

A VR headset or VR device is a head-mounted device that provides a virtual reality for the end-user. They are used to provide immersive experiences via a stereoscopic head-mounted display. When the user puts on the VR headset, a proper experience requires the absence of real-world visual stimulus, so the user must set-up the VR device properly (e.g., via some adjustment strips) in operations that can take time.

Every time the user swaps from the VR device to the real world (e.g., to read a password, attend a call, etc.) the VR experience suffers as the operation of taking-off/putting-on the VR device is time consuming.

These devices are SIM-less devices, i.e., no cellular communication capability can be offered due to the lack of SIM card.

Every time a user is engaged in a VR (Virtual Reality) experience with a VR device the user might need to interact with the external environment, which requires a heavy-friction process:

Pause the VR activity.

Take off the VR device.

Perform the required activity.

Put on the device and adjust it.

Continuing with the VR activity.

One of the typical situations in which this process might be required is when users receive incoming calls. A possible solution may let users receive notifications about incoming calls received on their mobile devices. Users could decide whether to ignore the call or accept it and answer it in the VR device (no need to take the VR device off).

However, users need to link their mobile subscriptions or other services subscription with the VR device if they want to use to receive calls or consume those services.

The present invention satisfies this demand.

DESCRIPTION OF THE INVENTION

The invention describes a system and method that permits users of VR devices to pair them with an external service subscription. External services subscription can comprise e.g., a mobile subscription, a software service, an over-the-top communication service, a music service, etc., that may require login via e.g., user/password or other methods.

The pairing process comprises verifying that the user is the owner of the external service to be used without interrupting the ongoing VR experience.

To enable all these features the users can configure the external service to be used in the VR device via the paring process. Users can pair/unpair the external service to the VR device dynamically.

When the external service subscription comprises a mobile subscription associated with a mobile device, the invention permits:

Verify the ownership of the mobile subscription; and

Avoid the user to interrupt ongoing VR experiences to do so.

For privacy reasons, linking the VR device with the mobile subscription both devices require proving that the user is the owner of the mobile subscription, to be used. Starting this authorization process on the VR device may comprise the following steps:

The user decides to pair the VR device with his/her mobile phone when using the VR device.

The VR device requests the mobile phone number.

The authentication/authorization challenge is sent to the mobile phone with the phone number.

The user successfully authenticates the mobile phone to get a pairing code.

The user switches back to the VR device, where the user is prompted to enter the pairing code.

The VR device is granted access to the mobile subscription and the pairing process is completed.

This process may be inconvenient as it may require the user to take off the VR headset and put it on again. To enable all these features whilst avoiding the previous inconveniences, the users can configure the mobile subscription to be used in the portable device via a paring process according to the present invention. Users can pair/unpair a mobile subscription to the portable device dynamically.

This invention offers a significant improvement on the experience of pairing in portable devices. When the portable device is a VR device, the present invention avoids the need to take off/put on the VR headset during a pairing process.

The present invention simplifies pairing as in the simplest case, users would just need to enter the mobile number to paired and have that device in the proximity.

The present invention also enables the experience to take place just in the moment when the user needs it (no need to do it in advance).

Hence, a first aspect according to the present invention refers to a method for performing a pairing process between a VR device and an external service subscription associated with an external device, the external service subscription having a subscription ID, the VR device comprising computing means to perform the pairing process, the external device comprising pairing means to perform the pairing process and means to be logged into the service subscription, wherein the pairing process is authenticated by an authentication module configured to perform authentication via the external device to verify that a user is authorized to use the service subscription.

The method comprises prompting the user via the computing means in the VR device to introduce or select a subscription ID associated to the external service subscription in the VR device.

The method comprises receiving in the authentication module a request to validate the ownership of the external service subscription.

The method comprises sending from the authentication module a challenge to the user to the external device to prove the ownership of the external service subscription, wherein the challenge comprises sending a pairing code to the user.

The method comprises emitting via the computing means in the external device an acoustic signal that corresponds to the pairing code.

Upon receiving the acoustic signal in the VR device, the method comprises decoding the pairing code and validating the decoded pairing code with the authentication module and completing pairing between the VR device and the external service subscription associated with the external device upon successful validation of the decoded pairing code by the authentication module.

In an example, completing pairing between the VR device and the external service subscription associated with the external device comprises:

a) creating via the authentication module a set of user credentials;

b) retrieving via the computing means in the VR device the set of user credentials from the authentication module; and c) using the set of user credentials to authenticate the VR device in the external service.

Furthermore, completing pairing between the VR device further comprises between steps a) and b):

prompting the user via the pairing means to create a one-use passcode to secure the set of user credentials;

prompting the user via the computing means in the VR device to provide the subscription ID and the one-use passcode; and providing via the computing means to the authentication module the subscription ID and the one-use passcode.

In one example, sending via the authentication module a challenge to the user to prove the ownership of the external service subscription comprises sending a push notification to the external device comprising the pairing code when the external service subscription is a digital service.

In one example, sending via the authentication module a challenge to the user to prove the ownership of the external service subscription comprises sending the pairing code via SMS or mobile application to the external device when the external device is a mobile device and the external service subscription is a mobile subscription. Furthermore, the method comprises using a Mobile Subscriber Integrated Services Digital Number, MSISDN as the subscription ID when the external device is a mobile device and the external service subscription is a mobile subscription.

In the same example, the method comprises suggesting to the user one or more MSISDNs as candidate subscription ID, the MSISDN being those that are part of the same contractual relationship with a network operator than a fixed broadband data connection through which the VR device is connected.

In another example, the method further comprises using a PIN code, numeric values, patterns or keywords as the pairing code. In the same example, the method further comprises using ultrasounds as the acoustic signal.

In another example, the challenge further comprises checking that the user's voice footprint matches the footprint stored by the authentication module in association with the external service subscription.

A second aspect according to the present invention refers to a system for performing a pairing process between a VR device and an external service subscription associated with an external device, the external service subscription having a subscription ID The system comprises the VR device comprising computing means to perform the pairing process, the external device comprising pairing means to perform the pairing process and means to be logged into the service subscription; and an authentication module configured to perform authentication via the external device to verify that a user is authorized to use the service subscription. The system is configured to perform the method according to the first aspect of the present invention.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF A PREFERRED EXAMPLE

Figure 1:
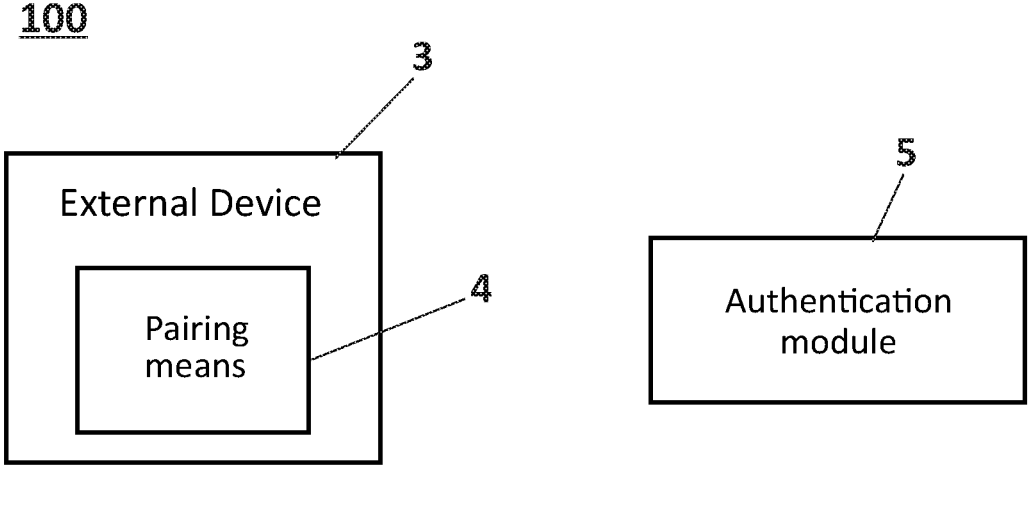
FIG. 1 shows the main elements of the system for pairing process between a VR device and an external service subscription associated with an external device.
Figure 1:
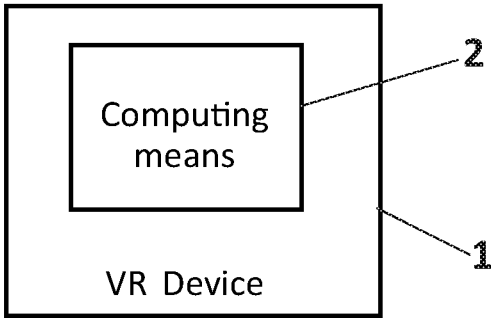

FIG. 1 shows the main elements of the system (100) for performing a pairing process between a VR device (1) and an external service subscription associated with an external device (3), that is, that the service can be consumed at the external device (3), e.g., because the user is authenticated to the service at the external device (3).

The system (100) comprises the external device (3) that can be logged (or can be logged) into the external service subscription and comprises pairing means (4) for performing pairing with another device, as e.g., the VR device (1).

The system (100) also comprises the VR device (1) capable of offering users an immersive experience. The VR device (1) comprises computing means (2) to perform pairing between the VR device (1) and the external service subscription and using the authorized subscription, e.g., managing incoming calls in the VR device (1) when the external service subscription is a mobile subscription.

The system (100) also comprises an authentication module (5). The authentication of the external device (3) is supported by the authentication module (5) that guarantees that the user is authorized to use the subscription (by verifying ownership, credentials, etc.).

Figure 2:
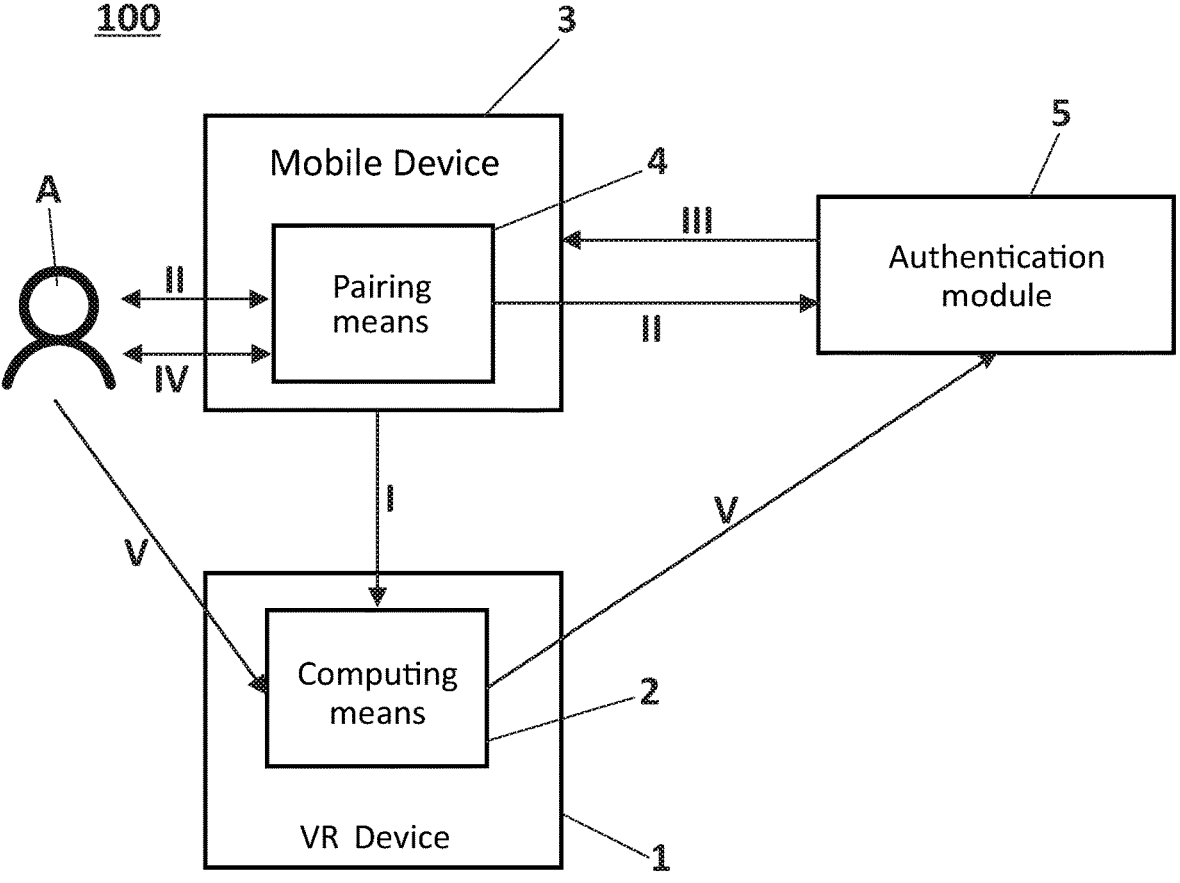
FIG. 2 shows a first example of pairing process between a VR device and an external service subscription associated with an external device according to present invention.

A first example of a pairing process between a VR device (1) and the external service subscription associated with an external device (3) being a mobile device is shown in FIG. 2.

In this first example, the pairing process can start in the user's mobile device where the authentication and authorization steps can be performed before using the VR device (1).

The authentication module (5) guarantees that the user (A) is in possession of the mobile device using the external service subscription to be paired to the VR device (1) and verifies the credentials used during the pairing process.

The pairing means (4) could be e.g., a mobile app for pairing devices that can allow the user (A) to carry out the following steps as shown in FIG. 2.

As mentioned, for this first example, the external device (3) is a mobile device and the external service subscription is a mobile subscription. The mobile device is using a mobile subscription and comprising a SIM card associated to a Mobile Subscriber Integrated Services Digital Number, MSISDN, and to a mobile carrier supported by an IP Multimedia Subsystem, IMS, network.

Step I: The pairing means (4) of the mobile device can be configured to find the VR device (1) connected to the same network (e.g. Wi-Fi network) to which the mobile device (3) is connected. The user may be able to select the device to be paired, i.e., the VR device (1).

Step II: The pairing means (4) of the mobile device can be configured to offer the user (A) the possibility to link the VR device (1) to the MSISDN associated with the mobile subscription used by the mobile device, which triggers the authentication request to the authentication module (5)

Step III: Authenticate via the authentication module (5) the ownership of the mobile subscription (e.g., via a PIN code received via SMS at the mobile device, which by the mere fact of its reception demonstrates that the mobile subscription is active in the mobile device). In case the external service is other type of service, such as a service provided in a mobile device application, then the PIN code may be received via a push notification at the mobile device application, which again demonstrates that the external service subscription is active in the mobile device.

Step IV: When the ownership of the mobile subscription is checked and the authentication is successful, a set of credentials can be created in the authentication module (5). In a preferred embodiment, the set of credentials can be protected by a one-use passcode decided by the user (A).

Step V: When the user (A) decides using the mobile subscription on the VR device (1), the user (A) can enter the MSISDN and the one-use passcode via the computing means (2) of the VR device (1) so the VR device (1) retrieves the credentials from the authentication module (5) that will enable to authenticate the identity of the mobile subscription, i.e. using their MSISDN associated to the mobile subscription in the VR device (1) and thus, completing the pairing process. As non-limitative examples, these credentials from the authentication module (5) can be used to register the VR device (1) in an IMS network or with a WebRTC gateway.

However, this previous process shown in FIG. 2 requires the user to know about this capability before using the VR device (1), which is not the typical discovery journey of such a feature. An alternative to make this process more suitable for the user journey would be using "sounds" as way to pair the VR and the physical device.

Figure 3:
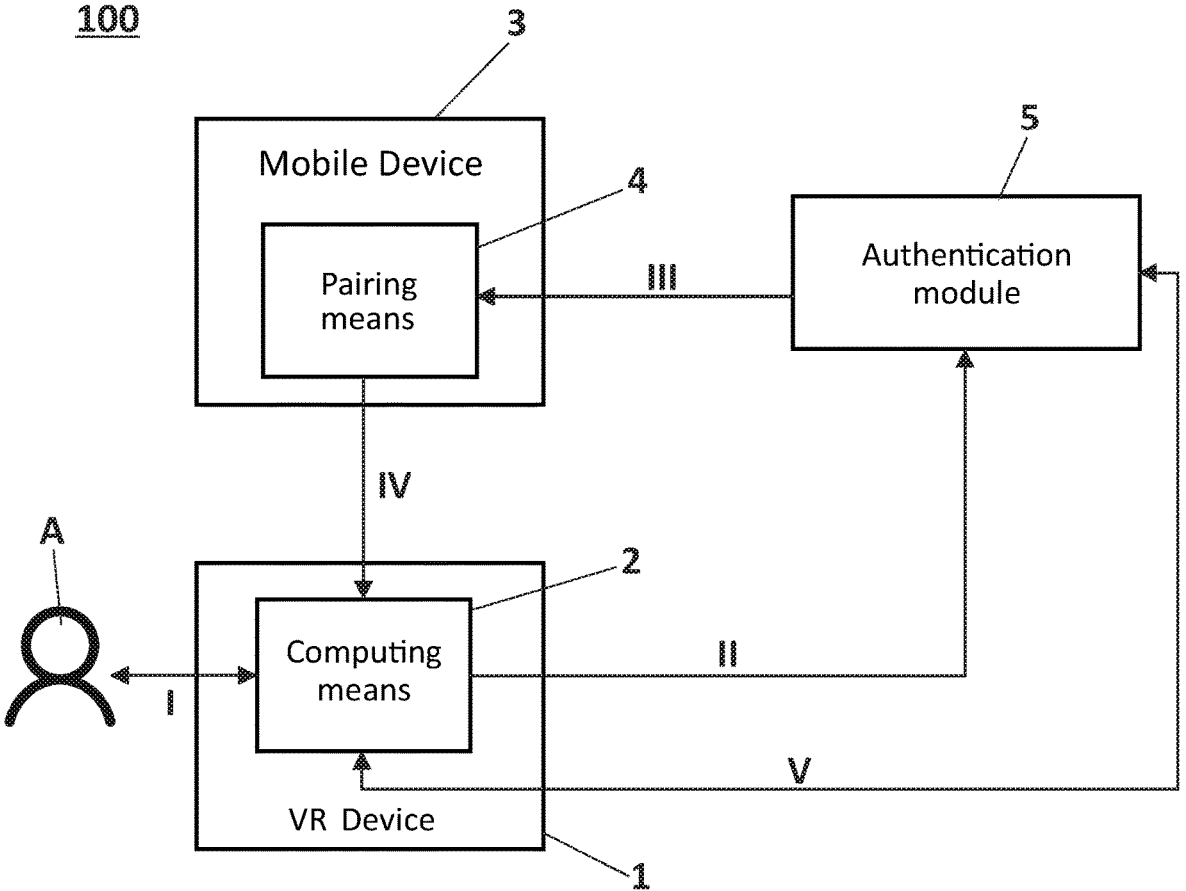
FIG. 3 shows a second example of a pairing process between a VR device and an external service subscription associated with an external device according to present invention.

An alternative example of a pairing process between a user's mobile device and the VR device (1) according to the present invention is shown in FIG. 3.

Step I: the first step is identifying the MSISDN to which the user wants to pair the VR device (1). One alternative is prompting the user (A) to enter the MSISDN. Another option to avoid the need to take off the VR device (1) during the pairing process would be prompting the user (A) to speak aloud the digits of the MSISDN.

Alternatively, a short list of candidate MSISDNs may be presented to the user for selection. This can be achieved by identifying the different MSISDNs associated to the same network subscription as the network through which the VR device (1) is connected. The user (A) may have a fixed broadband data connection and one or more mobile subscriptions as part of the same contractual relationship with a network operator. One way of obtaining the candidate MSISDN(s) (not shown in FIG. 2) is sending the IP address of the VR device (1) to the authentication module (5). The authentication module (5) can check whether that IP address is used at a fixed or mobile subscription known by the authentication module (5) and if that is the case, provide to the VR device (1) with a list of the MSISDNs associated to the same network subscription as candidate MSISDNs.

For instance, the user (A) may have a fixed broadband and two different mobile subscription as part of the same network subscription, that is, under the same contractual relationship with a network operator. If the VR device (1) is connected to a WiFi network connected to the Internet through that fixed broadband data connection, or alternatively through a WiFi hotspot set up at a mobile device using one of the mobile subscriptions then the two MSISDNs of the two mobile subscriptions may be provided to the user (a) as candidate MSISDN. Then the VR device (1) asks the user to select one of those candidate MSISDNs or enter a different one.

Step II: After selecting the MSISDN, the authentication module (5) will receive a request to validate ownership of the user's mobile device. In that moment, the VR device (1) will be put on hold, i.e., it will wait for the ownership to be proven before continuing.

Step III: The authentication module (5) can send a challenge so that the user (A) can proof the ownership of the mobile subscription associated to the MSISDN.

In one example, one way to achieve this is sending a PIN code (via SMS or notification to a mobile application) to the user's mobile device.

Step IV: When the challenge, e.g., the PIN code, is received, the pairing means (4) will emit some acoustic signals (e.g., read aloud, or based in ultrasounds) that uniquely corresponds to the challenge. Instead of PIN codes other identification mechanisms could be used (e.g. sound patterns, keywords, etc.). A sound pattern may be characterized by the frequencies of the sounds (e.g. tones) and the duration of sound and intermediate silences. The algorithm to code the challenge into an acoustic signal must be known to the pairing software, which codes the challenge into an acoustic signal. Moreover, the algorithm to decode the acoustic signal back into the challenge or a code that can be matched to the challenge by the authentication module (5), must be known to the computing means (2) which decodes.

The pairing means (4) can be an app pre-installed in the user's mobile device or some other type of software (a background service, a native capability, etc.).

To prevent malicious use of this solution, the pairing means (4) can request an additional factor of authentication, e.g., using vocal biometry: the user (A) has a preconfigured footprint (authentication sound) of his/her voice. Furthermore, a valid verification of that footprint can be required before emitting the authentication sound, e.g. asking the user to say aloud a specific word, code or sentence or just to speak aloud saying anything and checking that that footprint matches the footprint stored by the authentication module (5) in association with the external service subscription.

The computing means (2) of the VR device (1) can be continuously monitoring for the acoustic signals to be listened.

Step V: When these signals are spotted by the computing means (3) of the VR device (1), the authentication challenge that can proof that the user (A) is the owner of the mobile subscription associated to the MSISDN, e.g., the PIN code, will be decoded and validated against the authentication module (5).

If the challenge is deemed as valid by the authentication module (5), the VR device (1) will be authorized to use the mobile subscription. This can be done, for instance, by the VR device (1) retrieving credentials from the authentication module (5), said credentials allowing the VR device (1) to authenticate with services with the identity of the mobile subscription. As non-limitative examples, these credentials can be used to register in an IMS network or with a WebRTC gateway.

This pairing method, although suggested for VR device (1) in the preferred example, could be used for any type of device in which performing some of these actions are not straightforward (e.g., devices with no keyboard).

The description and drawings merely illustrate the principles of the invention. Although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for performing a pairing process between a VR device and an external service subscription associated with an external device, the external service subscription having a subscription ID, the VR device comprising a computing device to perform the pairing process, the external device comprising a pairing system to perform the pairing process and access into the service subscription, wherein the pairing process is authenticated by an authentication module configured to perform authentication via the external device to verify that a user is authorized to use the service subscription, the method comprising:

prompting the user via the computing device in the VR device to introduce or select a subscription ID associated to the external service subscription in the VR device;

receiving in the authentication module a request to validate the ownership of the external service subscription;

sending from the authentication module a challenge to the user to the external device to prove the ownership of the external service subscription, wherein the challenge comprises sending a pairing code to the user;

emitting via the computing device in the external device an acoustic signal that corresponds to the pairing code;

upon receiving the acoustic signal in the VR device, decoding the pairing code and validating the decoded pairing code with the authentication module; and completing pairing between the VR device and the external service subscription associated with the external device upon successful validation of the decoded pairing code by the authentication module.

2. The method according to claim 1, wherein completing pairing between the VR device and the external service subscription associated with the external device comprises:

a) creating via the authentication module a set of user credentials;

b) retrieving via the computing device in the VR device the set of user credentials from the authentication module;

c) using the set of user credentials to authenticate the VR device (1) in the external service.

3. The method according to claim 2, wherein completing pairing between the VR device further comprises between steps a) and b):

prompting the user via the pairing system to create a one-use passcode to secure the set of user credentials;

prompting the user via the computing device in the VR device to provide the subscription ID and the one-use passcode; and providing via the computing device to the authentication module the subscription ID and the one-use passcode.

4. The method according to claim 1, wherein sending via the authentication module a challenge to the user to prove the ownership of the external service subscription comprises sending a push notification to the external device comprising the pairing code when the external service subscription is a digital service.

5. The method according to claim 1, wherein sending via the authentication module a challenge to the user to prove the ownership of the external service subscription comprises sending the pairing code via SMS or mobile application to the external device when the external device is a mobile device and the external service subscription is a mobile subscription.

6. The method according to claim 5, further comprising using a Mobile Subscriber Integrated Services Digital Number, MSISDN as the subscription ID when the external device is a mobile device and the external service subscription is a mobile subscription.

7. The method according to claim 6, further comprising suggesting to the user one or more MSISDNs as candidate subscription ID, the MSISDN being those that are part of the same contractual relationship with a network operator than a fixed broadband data connection through which the VR device is connected.

8. The method according to claim 1, further comprises using a PIN code, numeric values, patterns or keywords as the pairing code.

9. The method according to claim 1, further comprises using ultrasounds as the acoustic signal.

10. The method according to claim 1, wherein the challenge further comprises checking that the user's voice footprint matches the footprint stored by the authentication module in association with the external service subscription.

11. A system for performing a pairing process between a VR device and an external service subscription associated with an external device, the external service subscription having a subscription ID, the system comprising:

the VR device comprising computing device to perform the pairing process;

the external device comprising pairing system to perform the pairing process and access into the service subscription; and an authentication module configured to perform authentication via the external device to verify that a user is authorized to use the service subscription, wherein the system is configured to perform the method according to claim 1.

* * * * *